UNITED STATES PATENT OFFICE.

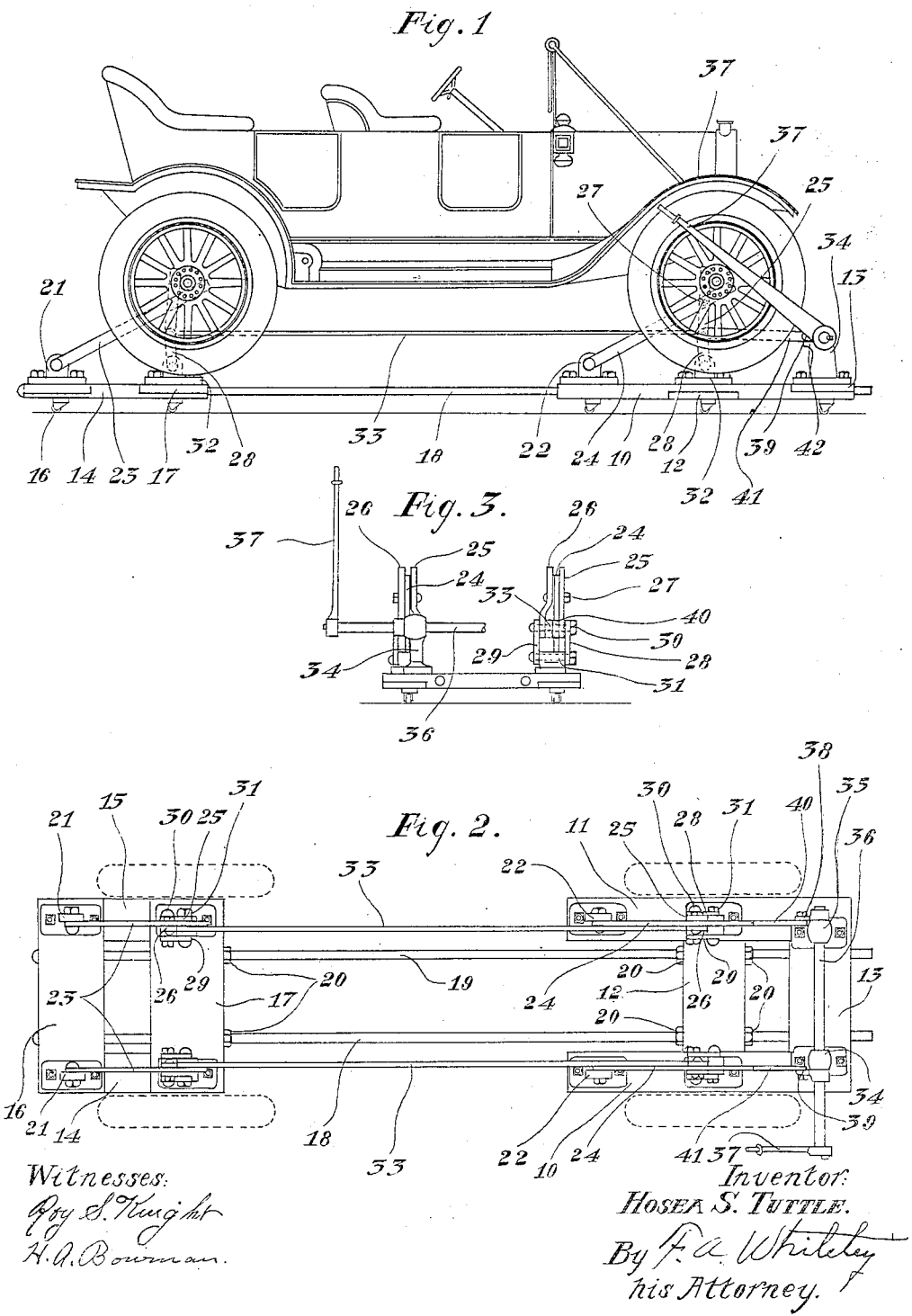

HOSEA S. TUTTLE, OF MINNEAPOLIS, MINNESOTA.

DEVICE FOR JACKING UP AUTOMOBILES OR OTHER VEHICLES.

1,056,235.  Specification of Letters Patent.  Patented Mar. 18, 1913.

Application filed April 3, 1912. Serial No. 688,319.

*To all whom it may concern:*

Be it known that I, HOSEA S. TUTTLE, a citizen of the United States, residing at Minneapolis, in the county of Hennepin and State of Minnesota, have invented certain new and useful Improvements in Devices for Jacking Up Automobiles or other Vehicles, of which the following is a specification.

My invention relates to devices for jacking up automobiles or other vehicles, especially such as employ pneumatic tires in which material damage to the tire fabric may be caused if the machine is left for any extended period of time resting upon the tires.

It is the object of my invention to provide means which may be conveniently placed in the ordinary garage and by which one man may with ease and despatch raise the automobile so that all four of the wheels will be free from the ground.

The full objects and advantages of my invention will appear in the detailed description thereof and are particularly pointed out in the claims.

In the drawings illustrating the application of my invention in one form,—Figure 1 is a side elevation of my device applied to an automobile in which the automobile is shown lifted. Fig. 2 is a plan view of the device. Fig. 3 is an end elevation.

In constructing the device two longitudinal frame members 10 and 11 may be secured together by transverse frame members 12 and 13 to form a front frame, a rear frame being somewhat similarly formed by means of a pair of longitudinal members 14 and 15 secured together by transverse members 16 and 17. The front and rear frames may be secured together in adjusted position by means of a pair of rods 18 and 19 extending longitudinally through cross members 12, 13, 16 and 17, and by means of nuts 20 threaded on to the rods 19 the distance apart of the front and rear frames may be varied to accommodate the same to automobiles of different lengths. The front and rear frames are formed sufficiently narrow so that an automobile may run over the same with the wheels on either side of said frames.

To bracket stands 21 on the rear cross-bar 16, and 22 on the rearwardly extended portions of longitudinal members 10 and 11 are pivoted pairs of link arms 23 and 24, respectively. Each of these arms extends between a pair of short links 25 and 26 to which it is pivotally connected by means of a bolt 27 as clearly shown in Fig. 3, and links 25 and 26 are in turn connected to a pair of links 28 and 29 preferably disposed outside of links 25 and 26 and pivotally secured thereto by means of bolt 30, links 28 and 29 being pivotally connected by bolt 31 to stands 32 on longitudinal members 10 and 11. Extending between the sets of toggle joints thus formed on the front and rear frames and pivotally connected at its ends to bolts 30 between link 25 and 28 on one side and 26 and 29 on the other are connecting links 33 so that movement given to one of said toggles will be communicated to the other. To effect this movement, journaled in bearings in stands 34 and 35 secured on cross-bar 13 is a shaft 36 having thereon a long lever 37 and a pair of short arms 38 and 39, said short arms being pivotally connected by links 40 and 41 with the bolts 30 of the toggle joint, said links 40 and 41 as clearly shown in Fig. 3 being positioned between link 33 and toggle link 25 on the bolts 30. As shown in dotted lines in Fig. 1 and also as shown in Fig. 2 the ends of the members 24 and the links 25 and 26 all extend beyond the pivot bolt 27 so that a V-shaped crotch is formed between the extended ends of each of these sets of bars adapted to receive the axles of an automobile as indicated in Fig. 1.

In operation when the lever 37 is thrown over to the right, the bars forming the jacking arrangement including bars 23 and 24 and the toggle links connected therewith will be lowered out of the way of the automobile as it is driven into position in the garage. By pushing back on the lever 37 to bring it to the position shown in Fig. 1, the rock shaft 36 is rotated and the short arms 38 and 39 thereon through links 40 and 41 force the toggle joint inwardly, thereby rocking bars 23 and 24 simultaneously on their pivots and elevating said bars beneath the axles of the automobile, which is thereby lifted clear of the ground as shown in Fig. 1, the extended ends of links 25 and 26 holding the axles to the bars 24. When the lever 37 has been thrown into its extreme raised position, the arms 38 and 39 will come into contact with stops 42 just after the toggles have been broken in the opposite direction so that the weight of the automobile operates to lock the parts in position with the automobile raised.

It will be obvious that the various stands 21, 22, 32, and 34 may each be bolted directly to the floor of the garage without the employment of the front and rear frames herein described, but from the fact that the extent of the wheel base of automobiles differs in different makes of automobiles and also differs from year to year with the same make, the adjustable structure herein described will be found advantageous.

Instead of using a single rock shaft 36, lever 37 and connecting links 38 to operate both sets of toggles and lift the entire automobile simultaneously, if desired the links 38 may be omitted and two sets of such rock shafts employed, although for practical purposes the connection as shown will be found advantageous, since the combination which I have shown will be capable of easy operation by one man to lift an automobile weighing several tons.

The economy and efficiency of my device will be apparent.

I claim,—

1. A jack for automobiles comprising a pair of pivoted arms pivoted at one end and positioned to engage the axle of an automobile outside of the body thereof, links pivotally connected with said arms at a point removed from the free ends thereof and having a portion of said links extending beyond the arms, said links being a part of a toggle for moving the arms about their pivots, and means for operating the toggle.

2. A jack for automobiles comprising two pairs of arms pivoted at one end and positioned to engage the front and rear axles of an automobile just inside the wheels thereof, a toggle joint lever system connected with each of said arms for swinging the same upwardly on their pivots, links connecting pairs of said toggles at each side to move in unison, a rock shaft, short arms on said rock shaft, links connecting said arms with the forward toggles, and a lever on the rock shaft.

3. A jack for automobiles comprising two pairs of arms pivoted at one end and positioned to engage the front and rear axles of an automobile just inside the wheels thereof, a toggle joint lever system connected with each of said arms for swinging the same upwardly on their pivots, links connecting pairs of said toggles at each side to move in unison, a rock shaft, short arms on said rock shaft, links connecting said arms with the forward toggles, stops for receiving and holding said short arms when the toggles have been swung past center opposite to their direction of lifting movement, and a lever on said rock shaft for swinging the arms.

4. A jack for automobiles comprising a pair of arms pivoted at one end and positioned to engage the axle of an automobile outside of the body thereof, a pair of links pivotally connected on each side of each of said arms at a point removed from the free ends thereof and having a portion of said links extending beyond the same, a pair of supporting links pivotally connected with and outside of each of said first pair of links to form a toggle joint therewith, a rock shaft, short arms on said rock shaft, and links from said arms connected with said toggle between said first named pair of links.

In testimony whereof I affix my signature in presence of two witnesses.

HOSEA S. TUTTLE.

Witnesses:
H. A. BOWMAN,
F. A. WHITELEY.